Patented Nov. 26, 1929

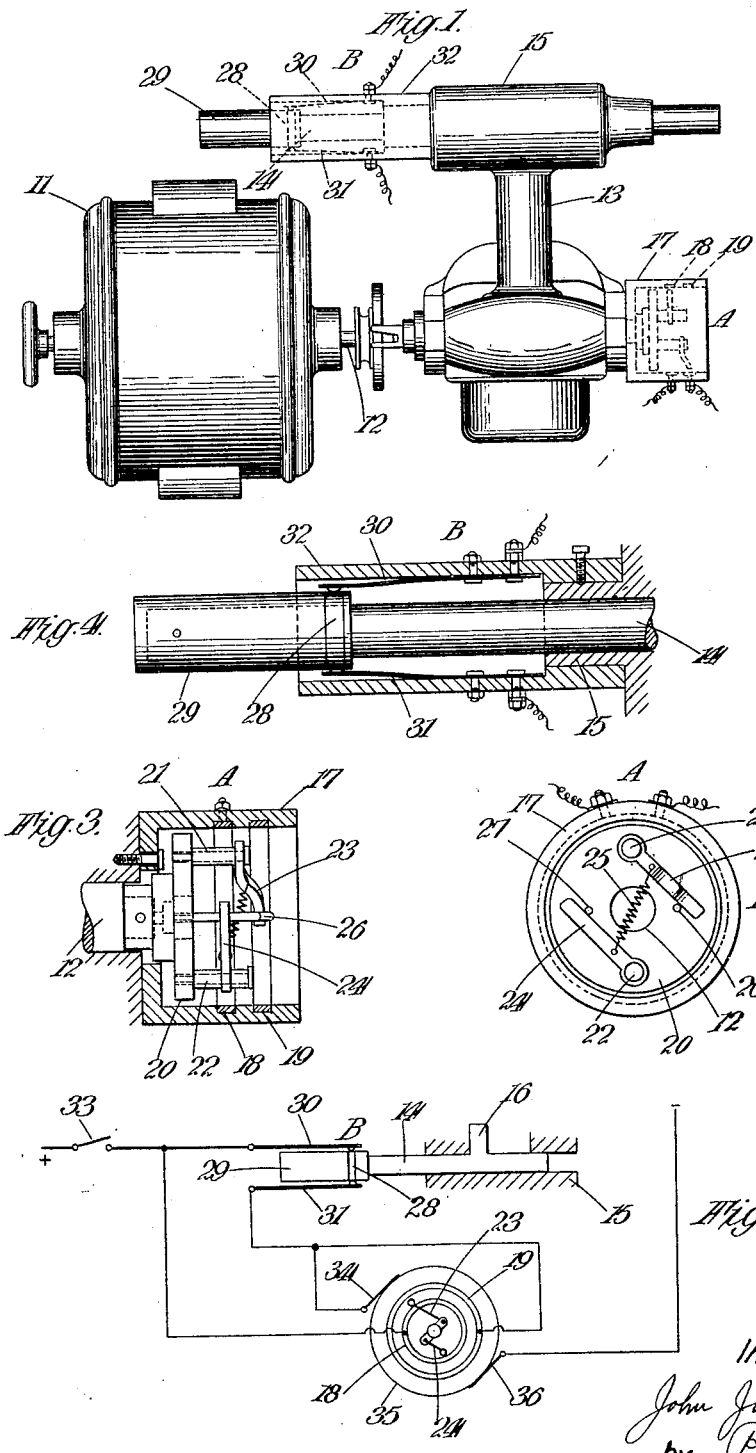

1,737,358

UNITED STATES PATENT OFFICE

JOHN JOSEPH COOPER, OF LONDON, ENGLAND, ASSIGNOR TO UNDERWOOD ELLIOTT FISHER COMPANY, OF NEW YORK, N. Y., A CORPORATION OF DELAWARE

CONTROL OF ELECTRICALLY-DRIVEN RECIPROCATORY APPARATUS

Application filed April 29, 1924, Serial No. 709,932, and in Great Britain September 27, 1923.

In electrically-driven apparatus (such as, for example, an adding or calculating machine of the Underwood-Hanson type) in which an oscillatory member makes a complete reciprocatory movement forth and back during each successive cycle of operation, it is desirable, in the event of such movement encountering a resistance so far exceeding the normal working load as to cause the electric motor to stop or to run at a speed appreciably less than the normal working speed, that the supply of current should be cut off from the motor in order that injury to the latter may be obviated, and the primary object of the present invention is to provide means whereby, in the circumstances referred to, the circuit through which the motor normally receives current will be automatically broken.

According to the invention the normal working circuit of the electric motor, so long as the latter is running at a speed exceeding a predetermined minimum limit, is closed through a switch (hereinafter termed the "cut-out switch") controlled by a speed-governed centrifugal (or equivalent) device driven by the motor, so that on the speed falling below said limit the motor circuit will be automatically broken; whilst, in order that the motor may be enabled to start notwithstanding the broken circuit at the cut-out switch, an alternative circuit is provided in parallel with that through the cut-out switch, this alternative or starting circuit passing through another switch (hereinafter termed the "starting-switch") so actuated in concurrence with the movements of the oscillatory member of the apparatus as to cause the motor circuit to remain closed, from the starting point of each cycle of the reciprocatory movement, during an interval sufficient to allow of the motor attaining the predetermined minimum limit of speed, whereupon the cut-out switch will automatically effect the closure of the normal working circuit.

In the accompanying drawings which illustrate one form of the invention as applied to an electrically-driven adding or calculating machine of the type above referred to, Figure 1 is an inverted plan view of the electric motor and associated parts. Figure 2 is an end elevation, and Figure 3 is a side elevation of the switch hereinbefore referred to as the cut-out switch, the stationary casing being in axial section in Figure 3. Figure 4 is a side elevation of the switch hereinbefore referred to as the starting-switch, the stationary casing being in axial section. Figure 5 is a diagram of the electrical connections.

In Figure 1, 11 is an electric motor, whereof the horizontal armature-shaft 12 is in driving connection through the usual clutch mechanism and suitable gearing (not shown), with a reciprocatory member 14 fitted to slide to-and-fro in a guide 15 in a direction parallel with the shaft 12. A housing 13 encloses a portion of the gearing. The member 14 has a projection 16 (Figure 5) arranged to engage, and impart a corresponding to-and-fro motion to, the general operator of the adding machine (not shown); each reciprocation of the projection 16 being of definite amplitude corresponding with one complete cycle of movement of the adding mechanism, and assuming a state of rest in the Figure 1 position, at the termination of said cycle. All the above parts and movements are of well known character.

The cut-out switch A (Figures 1, 2 and 3) includes a hollow stationary cylinder 17 of insulating material mounted in axial alignment with the motor shaft 12 and carrying side-by-side on its inner periphery a pair of metal rings 18, 19 respectively connected to two parts of the circuit through which current is supplied to the motor during normal running, these rings being insulated from one another. Fast upon the motor shaft 12, but insulated therefrom, is a metal hub or disc 20 from which project, at diametrically opposite eccentric points, a pair of metal posts 21, 22 which extend within the insulating cylinder 17 and parallel to its axis; and to said posts are respectively pivoted metal arms 23 and 24 capable of angular movement in the plane of revolution of the shaft 12, the centrifugal effort, due to rotation of the shaft, being effective to swing said arms outwards so as to make trailing contact with the metal rings, the arm 23 with the ring 18 and the arm 24 with the ring 19. The outward movement of the arms is prevented, until the speed of revolution of the shaft attains a predetermined minimum limit, by a light spring 25 coiled in tension between the respective arms and serving to keep the latter normally retracted against stops 26, 27. On the speed of revolution attaining this limit, the arms 23, 24 swing outwards into contact with the respective rings 18, 19, the arms being electrically connected through the posts 21, 22 by reason of the metal disc 20 whereon the posts are carried. The circuit of the motor is thus closed between the rings.

In the example illustrated, the starting-switch B includes a metal bridging-piece in the form of a ring 28 held in a peripheral groove encircling a sleeve 29 of insulating material fast on one end of the reciprocatory member 14, so that, when the member 14 is in the Figure 4 position of its stroke (which corresponds with the starting-point of one complete cycle of its movement forth and back), the ring 28 establishes electrical connection between two spring contact-pieces in the form of tongues 30, 31 mounted within a hollow cylindrical support 32 of insulating material fixed on the corresponding end of the guide 15; the tongues 30, 31 being respectively connected to two parts of the circuit through which current is supplied to the motor at starting. The outer surface of the ring 28 is flush with the outer surface of the sleeve 29 and is of such width that, when a cycle of movement commences, the ring continues to maintain electrical contact between the tongues 30, 31 during an interval just sufficient to allow of the motor attaining the speed necessary to cause the arms 23, 24 to fly outwards so as to establish electrical contact between the rings 18, 19; after which the ring 28 passes from between the tongus 30, 31 which thenceforth, until the member 14 returns to near its starting point, bear against the surface of the insulating sleeve 29.

The arrangement of the circuits will be readily understood on reference to the diagram, Figure 5, wherein 33 represents the usual key-controlled switch interposed in the motor circuit and to be closed by the operator each time the machine is required to perform a cycle of movement. Assuming the various parts to be at rest in normal position as indicated, closure of the switch 33 allows current to pass therefrom through the tongue 30, ring 28, tongue 31, the brush 34, the commutator 35 of the motor, and brush 36 to return, with the result that the motor starts running. By the time the movement of the member 14 has carried the ring 28 from between the tongues 30, 31, the motor will have attained sufficient speed to cause the arms 23, 24 to contact with the rings 18, 19, whereupon current will pass from the switch 22 through the ring 18, arm 24, disc 20, arm 23, ring 19, brush 34 commutator 35, and brush 36 to return, so that the motor will be kept running during one complete cycle of movement of the projection 16, which drives the general operator. Upon return of the projection 16 to its starting position the usual clutch mechanism effects disconnection of the motor 11 from the reciprocating member 14, thus the cut-out switch A will cease rotating, and a consequent breaking of the motor-circuit controlled by said switch will result. The parts may be readjusted to normal or starting position by hand.

I claim:—

1. In the art of control-systems for electric motors for driving machines in which an oscillatory member makes a complete reciprocatory movement forth and back during each successive cycle of operations, the combination of the normal working circuit of the motor, a switch including speed-governed devices operated by the motor for automatically effecting the closing of said circuit so long as the motor is running at a speed exceeding a predetermined minimum limit and opening said circuit on the speed of the motor falling below said limit and means depending on the position of the reciprocatory member for short circuiting said switch at the completion of a cycle, so that said motor may be started from rest for the beginning of a cycle, said means being arranged to break the short circuit in the initial portion of said cycle, so that thereupon the motor may be under sole control of said switch and speed-governed devices.

2. In the art of control-systems for electric motors for driving machines of a class in which the electric motor drives a member which completes one cycle of operations at each operation of the motor, the combination of a starting switch for the motor which is already closed by said member at the beginning of said cycle of operations, but which, due to an additional movement of said member, becomes ineffective, at the close of an interval of time, when the motor has attained a predetermined speed, and a speed-governed cut-out device for establishing another circuit through the motor when said starting switch becomes ineffective as aforesaid.

3. In the art of control-systems for electric motors for driving machines of a class in which the electric motor drives a reciprocatory member of the machine which completes one cycle of operations at each reciprocation, the combination of a starting switch for the motor which is already closed by said member at the beginning of said cycle of operations, but which, due to an initial movement of said member, becomes ineffective at the close of an interval of time, when the motor has attained a predetermined speed, and a speed-governed device for maintaining the motor-circuit closed when said switch becomes ineffective, said speed-governed device arranged to open the motor-circuit automatically upon a predetermined reduction in speed of the motor.

4. In the art of control-systems for electric motors for driving machines of a class in which the electric motor drives a member of the machine for a single cycle of operations at each operation of the motor, the combination of a starting circuit for the motor, a starting switch for controlling the starting circuit, including means, depending on an initial movement of said member, for opening the switch at the close of an interval of time, by which time the motor has attained a predetermined speed, and a motor-working circuit including a speed-governed switch for automatically establishing said working circuit at said opening of the starting circuit and maintaining the working circuit as long as the motor is running at a speed exceeding a predetermined minimum limit, and disestablishing the working circuit on the speed of the motor falling below said limit.

5. In the art of control-systems for electric motors for driving machines in which an oscillatory member makes a complete reciprocatory movement forth and back during each successive cycle of operations, the combination of starting and working motor-circuits in parallel, a starting switch for closing the starting circuit at the beginning of a cycle of operations of the mechanism, including means, depending on an initial movement of said member, for rendering said switch ineffective at the close of an interval of time, by which time the motor has reached a predetermined speed limit, and a centrifugally-actuated switch for closing the working circuit before the starting switch becomes ineffective, the switch for the working circuit being arranged to open automatically upon a reduction in speed of the motor to said predetermined limit.

6. In the art of control-systems for electric motors for driving a reciprocatory member of a mechanism which completes one cycle of operations at each operation of the motor, the combination of motor-starting and motor-working circuits, a starting switch moving with said reciprocatory member and arranged to open the motor-starting circuit at the close of an interval of time, by which time the motor has reached a predetermined speed limit, and a switch for controlling the motor-working circuit governed by the speed of the motor for closing the motor-working circuit before the motor-starting circuit becomes open, said speed-governed switch including a pair of contact rings and centrifugally-operated switch-arms moved into or out of contact with said rings to close or open said motor-working circuit.

7. In the art of control-systems for electric motors for driving a reciprocatory member of a mechanism which completes one cycle of operations at each operation of the motor, the combination of motor-starting and motor-working circuits, a starting switch moving with said reciprocatory member and arranged to open said motor-starting circuit at the close of an interval of time, by which time the motor has reached a predetermined speed, and a switch governed by the speed of the motor for controlling the motor-working circuit, including a pair of rings and contact elements moved into contact with the rings for closing said motor-working circuit and resilient means for withholding said contact elements from contact with the rings until a predetermined motor speed is attained.

8. In the art of control-systems for electric motors for driving the reciprocatory member which actuates the general operator of a machine, the combination of motor-starting and motor-working circuits, a starting switch for the motor-starting circuit, including a contact piece moving with said reciprocatory member, a pair of contact fingers in said starting circuit and bearing against said contact piece and completing the starting circuit at the beginning of a cycle of operations of the general operator, said contact piece moving out of contact with said fingers with the reciprocatory member as the motor reaches its working speed, a switch governed by the working speed of the motor for establishing said working circuit as said contact piece becomes ineffective by moving out of contact with said fingers, said speed-governed switch including a pair of contact rings in said working circuit, a hub fixed to the motor-shaft, and contact arms for the rings and pivoted on the hub and electrically connected to each other by the hub, and thrown by rotation of the motor-shaft into contact with the rings as the motor reaches a predetermined working speed, and falling out of contact with the rings on the speed of the motor falling below said predetermined speed.

9. In a controlling system for electric motors for driving a reciprocatory member which actuates a general operator of a mechanism, the combination of a motor-starting circuit, a switch for said circuit, including a sleeve of insulating material moving with said member, a contact ring on said sleeve, a pair of contact fingers in said circuit normally contacting with said ring, the reciprocatory movement of said member moving the ring out of contact with the fingers after the motor has reached a predetermined speed at the beginning of a cycle of operations of the general operator, a motor-working circuit, a switch for the working circuit governed by the speed of the motor to close the working circuit when the ring and fingers of the starting-circuit switch move out of contact with each other, said speed-governed switch including a stationary housing of insulating material, a pair of contact rings in the working circuit and mounted on the housing, a metallic hub adapted to be affixed on the shaft of the motor and enclosed in the housing, eccentrically-disposed pins on the hub, contact arms pivoted on the pins, stop-pins for the arms, and a spring connecting the arms and normally retracting the arms against the stop-pins, whereby, when the motor reaches its working speed, the arms swing into contact with the rings and close the working circuit, and when it falls below its working speed the arms will swing out of contact with the rings and thereby open the working circuit.

10. In the art of controlling systems for electric motors for starting and driving the motor for a one-cycle mechanism, the combination of a motor-starting circuit and a motor-working and driving circuit, said circuits arranged in parallel, for alternative use in passing current to the motor, a starting switch for the starting circuit controlled by said mechanism for automatically opening at the close of a time interval, by which time the motor has attained its normal running speed, and a motor-speed-controlled switch for the working circuit operable to close said working circuit when the starting circuit is opened when the motor has reached its normal running speed, as aforesaid, and open the working circuit when the motor stalls or falls below its normal working speed in driving the mechanism.

11. In a controlling system for starting and running electric motors for driving one-cycle mechanisms, the combination of a motor-starting circuit and a motor-working circuit in parallel, a starting switch for the starting circuit, means operated by the mechanism for opening said switch at the close of a time interval, by which time the motor attains its normal working speed, a motor-speed-governed switch for the working circuit, arranged to close the latter circuit when the motor reaches its working speed and open said circuit when the motor speed falls below its normal working speed in driving the mechanism, and a motor-line-supply switch in series with the switches for starting and operating the motor.

12. In a motor-control system for an intermittently operated motor, such as is used to operate mechanism at intermittent intervals, the combination with a cycle-initiating switch for starting the motor at the beginning of a cycle, of a switch-device, and a second switch-device, said switch-devices opening and closing branches of the motor-circuit, said branches connected in parallel and interposed between and in series with the cycle-initiating switch and the motor, the first switch-device having means normally keeping its branch closed to maintain at the beginning of a cycle a circuit through the motor enabling said motor to be started, said first switch-device having further means whereby it opens its branch to put the motor under control of the second switch-device after the starting of the motor has been effected, said second switch-device keeping its branch open when the mechanism is at rest and having means for closing its branch before the other branch is opened, said second switch-device also having means responsive to an overload condition, whereby its branch is opened to thereby break the circuit and stop the motor in response to said overload condition.

13. In a motor-control system for an intermittently operated motor, such as is used to operate mechanism at intermittent intervals, the combination with a cycle-initiating switch for starting the motor at the beginning of a cycle, of a switch-device, and a second switch-device, said switch-devices opening and closing branches of the motor-circuit, said branches connected in parallel and interposed between and in series with the cycle-initiating switch and the motor, the first switch-device having means normally keeping its branch closed to maintain at the beginning of a cycle a circuit through the motor enabling said motor to be started, said first switch-device having further means whereby it opens its branch to put the motor under control of the second switch-device after the starting of the motor has been effected, said second switch-device having means responsive to an overload condition, whereby its branch is opened to thereby break the circuit and stop the motor in response to an overload occurring during a cycle due to jamming of the mechanism or otherwise.

14. In a controlling system for an electric motor geared to a reciprocatory member which actuates a general operator of a one-cycle mechanism, the combination of a motor-starting circuit, a switch for said circuit, including an insulator moving with said member, a metallic contact piece on said insulator, a pair of stationary contact fingers in said circuit normally contacting with said contact piece, said insulator co-extensive with the extent of movement of said member, the reciprocatory movement of said member moving the contact piece out of contact with the fingers which thereupon bear upon said insulator after the motor has reached a predetermined speed at the beginning of a cycle of operations of the general operator, a motor-working circuit, a switch for the working circuit governed by the speed of the motor to close the working circuit when the contact piece and fingers of the starting circuit switch move out of contact with each other, said speed-governed switch including a stationary housing of insulating material, a pair of contact rings in the working circuit and mounted on the housing, a metallic hub keyed to the shaft of the motor for rotation therewith and enclosed in the housing, eccentrically-disposed metallic pins on the hub, metallic contact arms pivoted on the pins, stop-pins for the arms, and a spring connecting the arms and normally retracting the arms against the stop-pins, whereby, when the motor reaches its working speed, the arms swing by centrifugal force into contact with the rings and close the working circuit, and when it falls below its working speed the arms will swing out of contact with the rings and thereby open the working circuit.

JOHN JOSEPH COOPER.